W. H. JOHNSON.
AUTOMATIC LEER FEEDER.
APPLICATION FILED JAN. 18, 1917.

1,316,160.

Patented Sept. 16, 1919.
2 SHEETS—SHEET 2.

WITNESSES:
Frank A. Sable
Josephine Gasper

INVENTOR
William H. Johnson,
BY
Hood & Schley
ATTORNEYS

UNITED STATES PATENT OFFICE.

WILLIAM H. JOHNSON, OF TERRE HAUTE, INDIANA.

AUTOMATIC LEER-FEEDER.

1,316,160. Specification of Letters Patent. Patented Sept. 16, 1919.

Application filed January 18, 1917. Serial No. 142,983.

*To all whom it may concern:*

Be it known that I, WILLIAM H. JOHNSON, a citizen of the United States, residing at Terre Haute, in the county of Vigo and State of Indiana, have invented a new and useful Automatic Leer-Feeder, of which the following is a specification.

It is the object of my invention to feed bottles or other articles automatically on to a conveyer, so that they are evenly distributed thereon and loss from breakage and other causes is reduced to a minimum; and especially to feed glass articles such as bottles into a leer.

Figure 1:
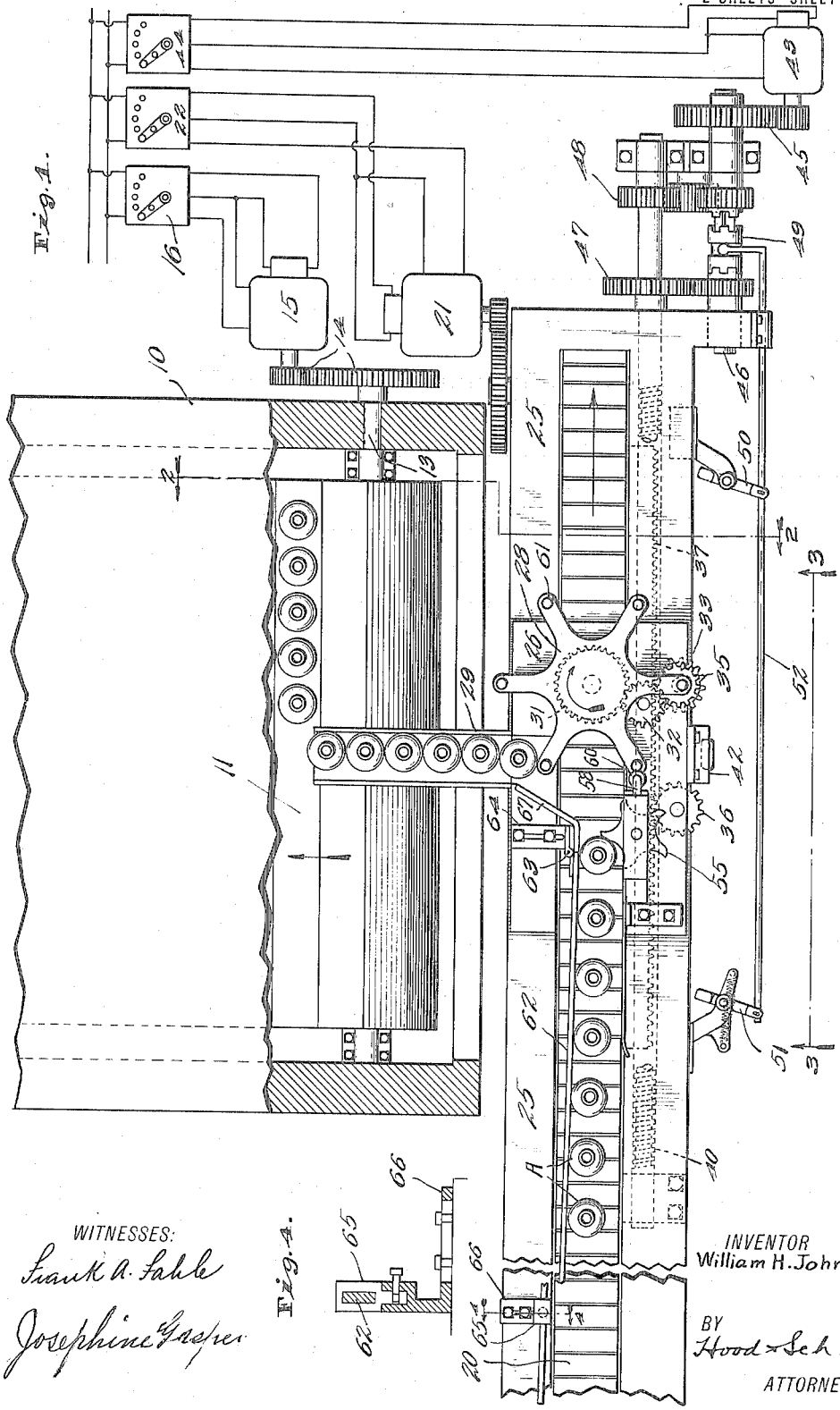
Figure 2:
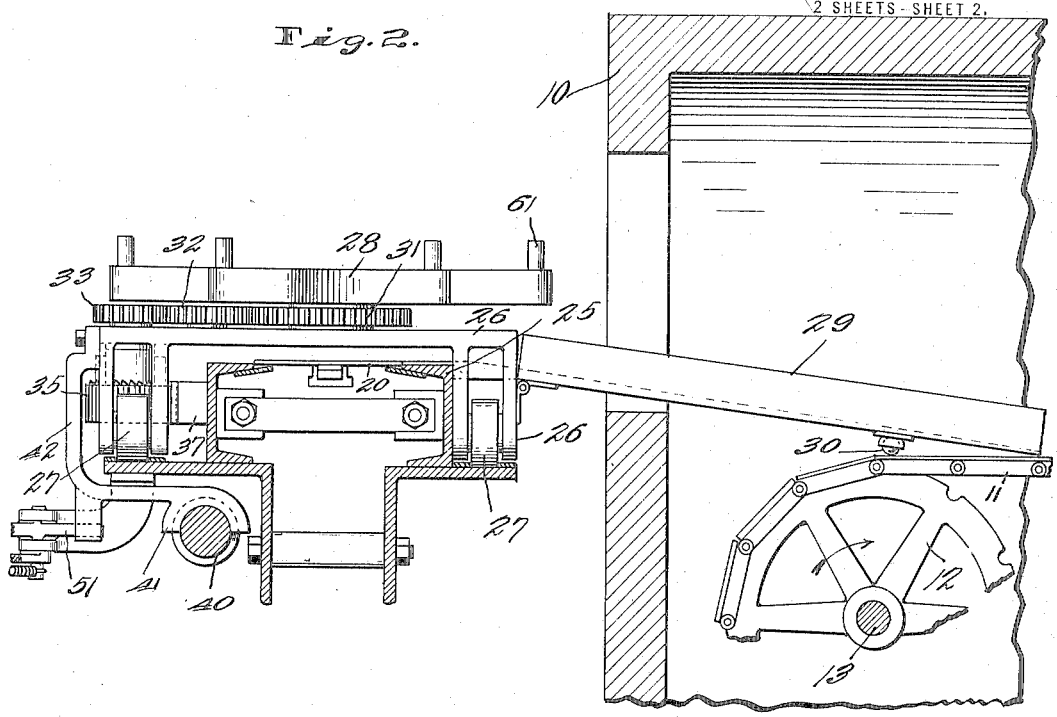
Figure 3:
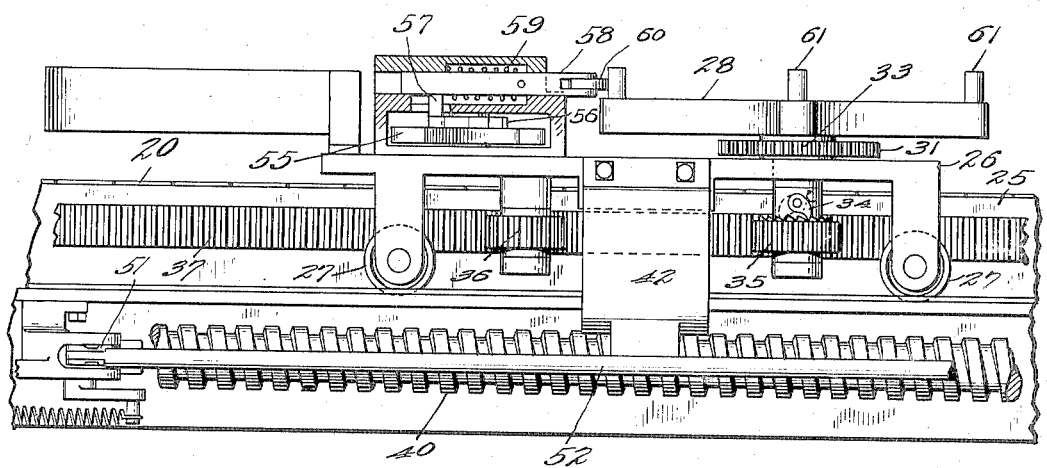

The accompanying drawings illustrate my invention. Figure 1 is a plan of a portion of a leer, and an automatic leer feeder embodying my invention; Fig. 2 is an enlarged elevation, in part section viewed from the line 2—2 of Fig. 1; Fig. 3 is a similarly enlarged elevation, in part section viewed from the line 3—3 of Fig. 1; and Fig. 4 is a section on the line 4—4 of Fig. 1.

The leer 10 may be of any usual type, having the usual walls and ceiling, and within it is mounted an endless apron 11 carried on suitable sprockets 12 on suitable shafts 13 mounted in the leer walls, one of the shafts projecting through the leer wall and being connected in any suitable manner, as by gears 14, to a variable speed driving motor 15, conveniently an electric motor controlled by a speed-varying rheostat 16.

Extending along the front of the leer 10, but preferably outside thereof, is an endless conveyer 20, which is slightly higher than the apron 11. This endless conveyer 20 receives bottles or other articles to be annealed, from any suitable source or sources, in a way forming no part of the present invention, and carries them in the direction of the arrow along the front of the leer for discharge thereinto. This conveyer may be operated through any suitable gearing by a variable speed motor 21, also conveniently an electric motor controlled by a speed-varying rheostat 22.

At the discharge portion of the conveyer 20 there is a frame 25, the two parts of which extend along the two sides of the conveyer 20 for more than the full width of the leer, as is clear from Fig. 1. A carriage 26 is arranged to travel on rollers 27 on this frame 25 back and forth in a direction parallel to the conveyer 20. This carriage 26 at one end bridges the conveyer 20, and on the bridge portion is mounted a feeder star wheel 28 which turns on a vertical axis in the direction of the arrow, so as to feed bottles A from the conveyer 20 into a hinged chute 29 projecting through a horizontal slot in the front wall of the leer 10, as is clear from Fig. 2. The chute 29 is hinged at one end on the frame 26, and near the other is provided with casters 30 which rest on the endless apron 11, this latter end of the chute discharging on to such apron 11 substantially in the plane thereof. Preferably the chute 29 is slightly inclined, as shown in Fig. 2, so that the bottles A travel down it easily. The carriage 26 is notched opposite the upper end of the chute 29, so that the bottles may pass from the conveyer 20 through such notch into such chute. The vertical shaft of the feeder star wheel 28 has fixed thereon a gear 31 which is connected through an idler pinion 32 to a gear 33 having a pawl and ratchet connection 34 to a pinion 35, all these parts being carried by the carriage 26. The pinion 35, and also a similar idler pinion 36 provided near the other end of the carriage for assisting in guiding the carriage movements, mesh with a rack 37 on the side of the frame 25, so that as the carriage 26 moves to meet the bottles A, or to the left in Fig. 1, the action of the pinion 35 and rack 37 produces clockwise rotation of the feeder star wheel 28 to feed such bottles A from the conveyer 20 into the chute 29. When the carriage 26 moves in the reverse direction, however, the pinion 35 turns in the opposite direction but, because of the pawl and ratchet connection 35, the feeder star wheel 28 does not rotate.

In the arrangement shown, the carriage 26 is moved back and forth by a long screw 40 mounted in the frame 25 and meshing with a half nut 41 on the lower end of an arm 42 fixed to the carriage 26. The screw 40 is turned first in one direction and then in the other by a variable speed motor 43, also conveniently an electric motor controlled by a speed-varying rheostat 44. As shown, the motor 43 is connected by reducing gearing 45 to a countershaft 46, which is connectible to the screw 40 through two sets of gearing 47 and 48 for driving the shaft in opposite directions, to feed the carriage 26 to the left and right respectively. Either set of gearing 47 or 48 may be thrown into action by a double clutch 49. This clutch is shifted to throw the gearing 47 into action to produce driving of the carriage 26 to the left (Fig. 1) when such carriage reaches its right hand limit of movement and the arm 42 strikes a snap-action shift lever 50 to produce this operation of the clutch 49; and is shifted to throw the gearing 48 into action to produce driving of the carriage 26 to the right (Fig. 1) when such carriage reaches its left hand limit of movement and the arm 42 strikes a similar snap-action shift lever 51 to produce this operation of the clutch 49. The two shift levers 50 and 51 are interconnected by a rod 52 which also connects them to the sliding clutch member 49. Preferably, the relative gear ratios of the gearings 47 and 48 are such that the carriage 26 moves to the right somewhat more rapidly than it does to the left, and moves to the right at a greater speed than the speed of movement of the conveyer 20.

I have shown three separate motors 15, 21, and 43 for operating the apron 11, the conveyer 20, and the screw 40; but all or any two of these last-named parts may be driven from the same motor if desired. By providing separate motors, however, the relative speeds of these parts are more readily controlled.

In order to govern the entrance of the bottles A into the notches of the feeder star wheel 28, I provide a governor star wheel 55, which is carried by the carriage 26 and overlaps the conveyer 20 from the opposite side from that on which the chute 29 is mounted. This governor star wheel 55 is somewhat in advance of the feeder star wheel 28, as is clear from Fig. 1. This governor star wheel is provided with a number of latch teeth 56 equal in number to the fingers of such star wheel, and with these latch teeth a latch finger 57 coöperates to prevent the governor star wheel 55 from turning save when such latch is released. The latch finger 57, in the arrangement shown, is carried by a plunger 58 which is spring-pressed by a spring 59 to a position where such latch finger 57 engages one of the teeth 56 (see Fig. 3), and the plunger 58 is provided on its projecting end with a roller 60 which is engaged by upstanding pins 61 on the arms of the feeder star wheel 28 as the latter rotates so as to release the latch 57 and make it possible for the governor star wheel to turn as each arm of the feeder star wheel 28 reaches a definite position. If at this time there is a bottle bearing against that arm of the governor star wheel 55 which projects over the conveyer 20, such bottle pushes the governor star wheel 55 around and itself passes into a notch of the feeder star wheel and is carried thereby into the chute 29. However, each bottle A as it reaches the governor star wheel is held back thereby until this governor star wheel is thus released, so that the bottle cannot pass forward to the feeder star wheel save at a time when it will enter properly a notch of such feeder star wheel. In order to make certain that the bottles A all engage the governor star wheel 55 similarly, a guiding fence rail 62 is provided over the conveyer 20 on the opposite side thereof from the governor star wheel, so as to feed the bottles A into the notches of such governor star wheel. In the arrangement shown, one end of this fence rail is mounted on a hinge 63 on an adjustable cross slide 64 on the carriage 26, while the other slides through a pivoted guide 65 carried by an adjustable cross slide 66 mounted on the frame 25 or other stationary point beyond the range of travel of the carriage 26. This permits the fence rail 62 to slide back and forth with the carriage 26, and at the same time provides an adjustment to accommodate different sizes of bottles. At its right hand end, the fence rail 62 leads to an oblique guide rail 67 which coöperates with the feeder star wheel 28 to carry the bottles from the conveyer 20 into the chute 29.

In operation, the motors 15, 21, and 43 drive the apron 11, the conveyer 20, and the screw 40, the last alternately in opposite directions. Bottles are supplied to the conveyer 20 in any suitable way, and carried thereby to the right. The alternate driving of the screw 40 in opposite directions causes the screw 40 to move alternately to the left and to the right. When the carriage 26 moves to the left, the feeder star wheel 28 is caused to turn in the direction of the arrow, and the governor star wheel 55 holds back bottles A until such times as they can be admitted into notches of the feeder star wheel 28, at such time being released by the action of the upstanding pins 61 on the roller 60 to admit such bottles into such notches; which bottles are then carried by the feeder star wheel 28 into the swinging chute 29 and deposited by the latter on the apron 11. The bottles A are thus deposited on the apron for the full width of the latter, on account of the traveling of the carriage 26, the speed of travel of the apron 11 being regulated so that it is substantially filled with bottles. When the carriage 26 reaches its left hand limit of movement, the arm 42 strikes the shift lever 51 and throws the clutch 49 into position to cause the screw 40 to turn in the reverse direction, and thus cause the carriage 26 to move to the right, the gear ratio preferably being such that this movement of the carriage 26 to the right is faster than that of the conveyer 20. When the carriage 26 reaches its right hand limit of movement, the arm 42 actuates the shift lever 50 to return the clutch 49 to its first position and thereby cause the carriage 26 again to move to the left, whereupon it acts as before to feed bottles from the conveyer 20 on to the apron 11 in another line, the apron 11 having advanced sufficiently to permit this. The bottles thus deposited on the apron 11 are carried through the leer and discharged from the leer in any convenient manner.

I claim as my invention:

1. In combination, a delivery conveyer, a receiving conveyer movable transversely thereto, an article supporting carriage movable as a unit longitudinally of said delivery conveyer and provided with a lateral discharge outlet discharging on to said receiving conveyer, and means on said carriage for feeding articles from the delivery conveyer into said lateral discharge outlet.

2. In combination, a delivery conveyer, a receiving conveyer movable transversely thereto, a carriage movable longitudinally of said delivery conveyer and provided with a lateral discharge outlet leading to said receiving conveyer, means for reciprocating said carriage in its line of movement, and means on said carriage for feeding articles from the delivery conveyer into said lateral discharge outlet.

3. In combination, a delivery conveyer, a receiving conveyer movable transversely thereto, a carriage movable longitudinally of said delivery conveyer and provided with a lateral discharge outlet leading to said receiving conveyer, means for reciprocating said carriage in its line of movement, and means on said carriage for feeding articles from the delivery conveyer into said lateral discharge outlet, said feeding means being operative only when the carriage is advancing to meet the delivery conveyer.

4. In combination, a delivery conveyer, a receiving conveyer movable transversely thereto, a carriage movable longitudinally of said delivery conveyer and provided with a lateral discharge outlet leading to said receiving conveyer, means for reciprocating said carriage in its line of movement at a slower speed when advancing to meet the delivery conveyer than when moving in the same direction therewith, and means on said carriage for feeding articles from the delivery conveyer into said lateral discharge outlet.

5. In combination, a delivery conveyer, a receiving conveyer movable transversely thereto, a carriage movable longitudinally of said delivery conveyer and provided with a lateral discharge outlet leading to said receiving conveyer, means for reciprocating said carriage in its line of movement at a slower speed when advancing to meet the delivery conveyer than when moving in the same direction therewith, and means on said carriage for feeding articles from the delivery conveyer into said lateral discharge outlet, said feeding means being operative only when the carriage is advancing to meet the delivery conveyer.

6. In combination, a delivery conveyer, a receiving conveyer movable transversely thereto, a carriage movable longitudinally of said delivery conveyer, a chute hinged on said carriage at one end and riding on said receiving conveyer at the other so as to discharge thereupon, and means on said carriage for feeding articles from the delivery conveyer into said chute.

7. In combination, a delivery conveyer, a receiving conveyer movable transversely thereto, a carriage movable longitudinally of said delivery conveyer, a chute hinged on said carriage at one end and riding on said receiving conveyer at the other so as to discharge thereupon, means for reciprocating said carriage in its line of movement, and means on said carriage for feeding articles from the delivery conveyer into said chute.

8. In combination, a delivery conveyer, a receiving conveyer movable transversely thereto, a carriage movable longitudinally of said delivery conveyer, means for moving said carriage in opposite directions along said delivery conveyer, said means being controlled by the movements of the carriage to reverse the direction of carriage movement when predetermined positions are reached, and means on said carriage for feeding articles from the delivery conveyer to the receiving conveyer as the carriage advances to meet the delivery conveyer.

9. In combination, a delivery conveyer, a receiving conveyer movable transversely thereto, a carriage movable longitudinally of said delivery conveyer, a feeder star wheel carried by said carriage and rotatable by the movement of the carriage to feed articles from the delivery conveyer to the receiving conveyer, and a feeder governor carried by said carriage and controlling the movements of the articles along said delivery conveyer to said feeder star wheel.

10. In combination, a delivery conveyer, a receiving conveyer movable transversely thereto, a carriage movable longitudinally of said delivery conveyer, a feeder star wheel carried by said carriage and rotatable by the movement of the carriage to feed articles from the delivery conveyer to the receiving conveyer, a governor star wheel carried by said carriage and overlapping said delivery conveyer to obstruct the passage of articles on the delivery conveyer to said feeder star wheel, and means controlled by the movements of the feeder star wheel for releasing said governor star wheel so that it permits articles to pass to the feeder star wheel.

11. In combination, a delivery conveyer, a receiving conveyer movable transversely thereto, and article supporting feeder mechanism movable as a unit longitudinally of said delivery conveyer and receiving articles from said delivery conveyer and feeding them to said receiving conveyer.

12. In combination, a delivery conveyer, a receiving conveyer movable transversely thereto, and feeder mechanism reciprocable as a unit in a single line longitudinally of said delivery conveyer and receiving articles from said delivery conveyer and feeding them to said receiving conveyer when moving to meet the delivery conveyer.

13. In combination, a leer having a movable ware-supporting member within it and having at its receiving end a normally stationary wall with an opening through it, a conveyer extending along said wall on the outside of the leer in a direction transverse to the movement of said member, and means movable as a unit longitudinally of said conveyer for transferring bottles from said conveyer on the outside of the leer through said opening in the wall and depositing them on to said ware-supporting member.

14. In combination, an endless delivery conveyer, an endless receiving conveyer across the plane of which said delivery conveyer extends, an article-supporting carriage movable longitudinally of said delivery conveyer and provided with a lateral discharge outlet discharging onto said receiving conveyer, and means on said carriage for feeding articles from the delivery conveyer into said lateral discharge outlet.

15. In combination, an endless delivery conveyer, an endless receiving conveyer across the plane of which said delivery conveyer extends, a carriage movable longitudinally of said delivery conveyer and provided with a lateral discharge outlet discharging onto said receiving conveyer, means for reciprocating said carriage as a unit along said delivery conveyer between the two sides of said receiving conveyer, and means on said carriage for feeding articles from the delivery conveyer into said lateral discharge outlet.

16. In combination, a delivery conveyer, a receiving conveyer across the plane of which said delivery conveyer extends, and article-supporting feeder mechanism movable longitudinally of said delivery conveyer and receiving articles from said delivery conveyer and feeding them to said receiving conveyer.

17. In combination, a delivery conveyer, a receiving conveyer across the plane of which said delivery conveyer extends, and feeder mechanism reciprocable along said delivery conveyer between the sides of said receiving conveyer and receiving articles from said delivery conveyer and feeding them to said receiving conveyer.

In witness whereof, I have hereunto set my hand at Indianapolis, Indiana, this 11th day of January, A. D. one thousand nine hundred and seventeen.

WILLIAM H. JOHNSON.